United States Patent
Jamadagni et al.

(10) Patent No.: US 10,477,467 B2
(45) Date of Patent: Nov. 12, 2019

(54) METHOD AND SYSTEM FOR HANDLING VOICE AND NON-VOICE CALLS IN A CSFB SCENARIO

(71) Applicant: Samsung Electronics Co., Ltd., Gyeonggi-do (KR)

(72) Inventors: Satish Nanjunda Swamy Jamadagni, Bangalore (IN); Gert Jan Van Lieshout, Middlesex (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/401,805

(22) PCT Filed: May 15, 2013

(86) PCT No.: PCT/KR2013/004310
§ 371 (c)(1),
(2) Date: Nov. 17, 2014

(87) PCT Pub. No.: WO2013/172656
PCT Pub. Date: Nov. 21, 2013

(65) Prior Publication Data
US 2015/0148048 A1    May 28, 2015

(30) Foreign Application Priority Data

May 15, 2012    (IN) .......................... 1930/CHE/2012

(51) Int. Cl.
*H04W 36/14*    (2009.01)
*H04W 48/18*    (2009.01)
(Continued)

(52) U.S. Cl.
CPC ....... *H04W 48/18* (2013.01); *H04W 36/0022* (2013.01); *H04W 76/16* (2018.02); *H04W 88/06* (2013.01)

(58) Field of Classification Search
CPC .................. H04W 36/0022; H04W 76/026
USPC ............... 455/445, 412.2, 435.1; 379/189
See application file for complete search history.

(56) References Cited

U.S. PATENT DOCUMENTS 7,437,157 B1 * 10/2008 Satapathy ............. H04W 28/16
                                                                455/435.1
8,150,013 B2 * 4/2012 Buntin ................ H04L 12/6418
                                                                370/356
(Continued)

FOREIGN PATENT DOCUMENTS

CN    101895647 A    11/2010
JP    2010273339 A    12/2010
(Continued)

OTHER PUBLICATIONS

International Search Report dated Aug. 29, 2013 in connection with International Patent Application No. PCT/KR2013/004310, 3 pages.
(Continued)

*Primary Examiner* — Gary Lafontant

(57) ABSTRACT

A method and system for handling both voice and non-voice calls in a CSFB scenario is disclosed. An indication is provided to user equipment (UE) to indicate whether the CSFB call is a voice call or a non-voice call (CS data call). The indication can be provided to the UE by a wireless network in a RRC connection release message or a CS service notification message. Further, the UE upon receiving the indication from the network can indicate whether the CSFB call is a voice call or a data call to a target radio access network (RAN) by providing a priority bit indication to all the voice calls for differentiating the voice calls from non-voice calls. The RAN prioritizes all the voice calls ahead of non-voice calls for the UE in the CSFB scenario.

14 Claims, 3 Drawing Sheets

(51) Int. Cl.
*H04W 36/00* (2009.01)
*H04W 88/06* (2009.01)
*H04W 76/16* (2018.01)

(56) References Cited

U.S. PATENT DOCUMENTS

| | | | |
|---|---|---|---|
| 2004/0202158 A1* | 10/2004 | Takeno | H04L 45/02 |
| | | | 370/389 |
| 2010/0296484 A1 | 11/2010 | Wu | |
| 2011/0002268 A1 | 1/2011 | Dwyer et al. | |
| 2011/0194427 A1 | 8/2011 | Shirota et al. | |
| 2012/0034910 A1 | 2/2012 | Fang et al. | |
| 2013/0230024 A1* | 9/2013 | Lim | H04W 36/14 |
| | | | 370/331 |
| 2014/0269622 A1 | 9/2014 | Wu | |

FOREIGN PATENT DOCUMENTS

| | | | | |
|---|---|---|---|---|
| JP | 2012529250 A | 11/2012 | | |
| JP | 2012529251 A | 11/2012 | | |
| JP | 2013502188 A | 1/2013 | | |
| WO | 2010141787 A1 | 12/2010 | | |
| WO | 2010141788 A2 | 12/2010 | | |
| WO | WO 2010/141785 A1 | 12/2010 | | |
| WO | WO 2011/008563 A2 | 1/2011 | | |
| WO | WO 2011008563 A2 * | 1/2011 | | H04W 48/18 |
| WO | 2011020110 A1 | 2/2011 | | |
| WO | WO 2011/156604 A1 | 12/2011 | | |

OTHER PUBLICATIONS

Extended European Search Report issued for EP 13790917.2 dated Feb. 10, 2016, 11 pgs.
GSM, Global System for Mobile Communications, "3rd Generation Partnership Project; Technical Specification Group Services and System Aspects; Circuit Switched Fallback in Evolved Packet System; Stage 2 (Release 8)", 3GPP TS 23.272 V8.1.0 (Sep. 2008), Mar. 8, 2012, 46 pgs.
Ericsson, "Fast Return After CSFB", 3GPP TSG-SA WG2 Meeting #87, S2-114366, Oct. 4, 2011, 9 pgs.
(Part 1) Lte, "3rd Generation Partnership Project; Technical Specification Group Radio Access Network; Evolved Universal Terrestrial Radio Access (E-UTRA); Radio Resource Control (RRC); Protocol specification (Release 9)", 3GPP TS 36.331 V9.3.0 (Jun. 2010), Mar. 13, 2012, pp. 1-91.
(Part 2) Lte, "3rd Generation Partnership Project; Technical Specification Group Radio Access Network; Evolved Universal Terrestrial Radio Access (E-UTRA); Radio Resource Control (RRC); Protocol specification (Release 9)", 3GPP TS 36.331 V9.3.0 (Jun. 2010), Mar. 13, 2012, pp. 92-198.
(Part 3) Lte, "3rd Generation Partnership Project; Technical Specification Group Radio Access Network; Evolved Universal Terrestrial Radio Access (E-UTRA); Radio Resource Control (RRC); Protocol specification (Release 9)", 3GPP TS 36.331 V9.3.0 (Jun. 2010), Mar. 13, 2012, pp. 199-250.
"3rd Generation Partnership Project; Technical Specification Group Services and System Aspects; Circuit Switched (CS) fallback in Evolved Packet System (EPS); Stage 2 (Release 11)", 3GPP TS 23,272 V11.0.0, Mar. 2012, 87 pages.
Notice of Allowance dated May 22, 2017 in connection with Japanese Patent Application No. 2015-512580.
Office Action dated Jun. 26, 2017 in connection with Chinese Patent Application No. 201380026406.0.
Foreign Communication From a Related Counterpart Application, Japanese Application No. 2015-512580, Notification of Reason for Rejection dated Jan. 30, 2017, 8 pages.

* cited by examiner

[Fig. 1]
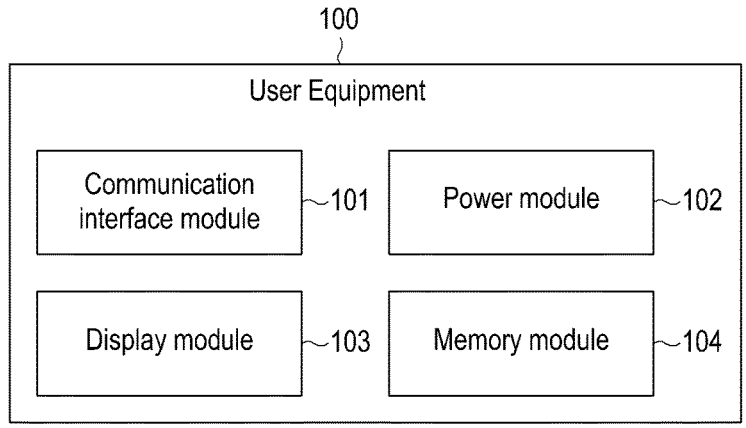
[Fig. 2]
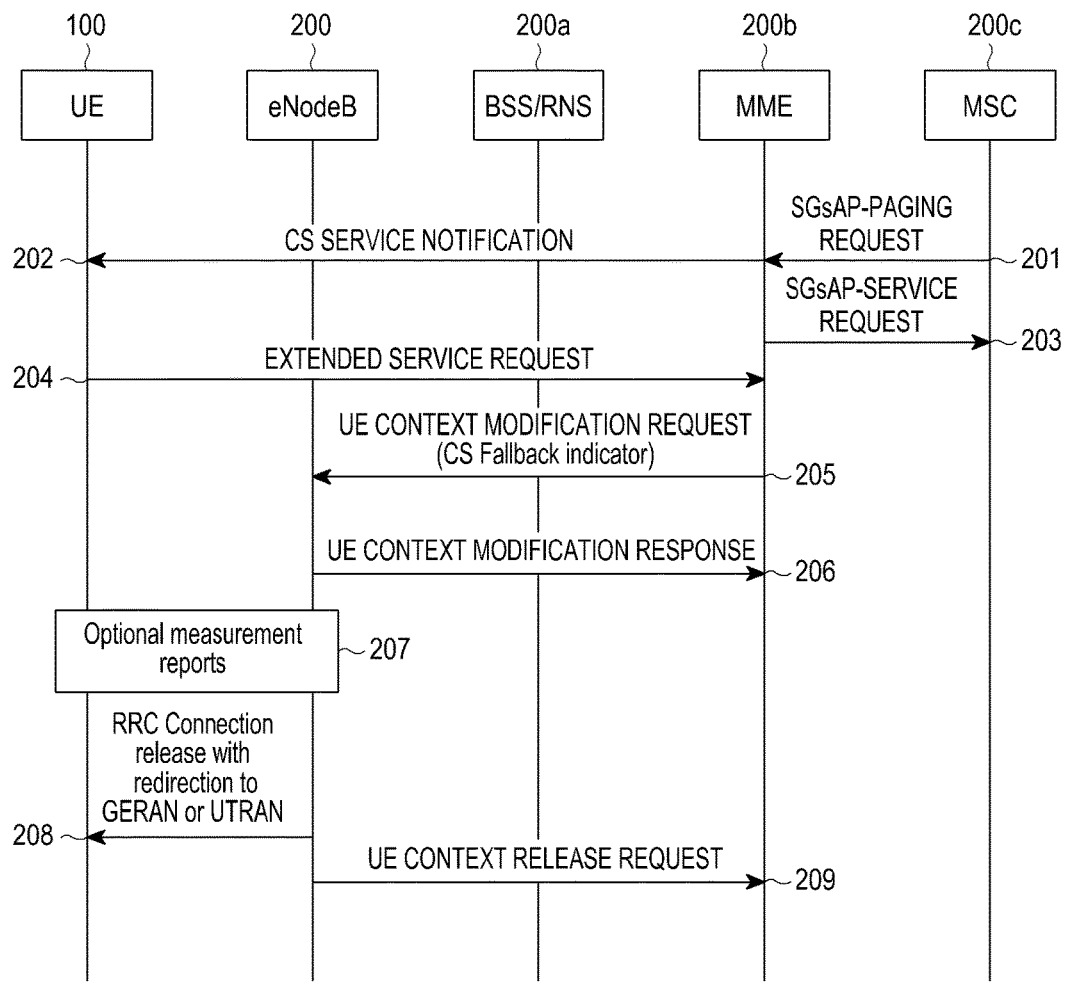

[Fig. 3]
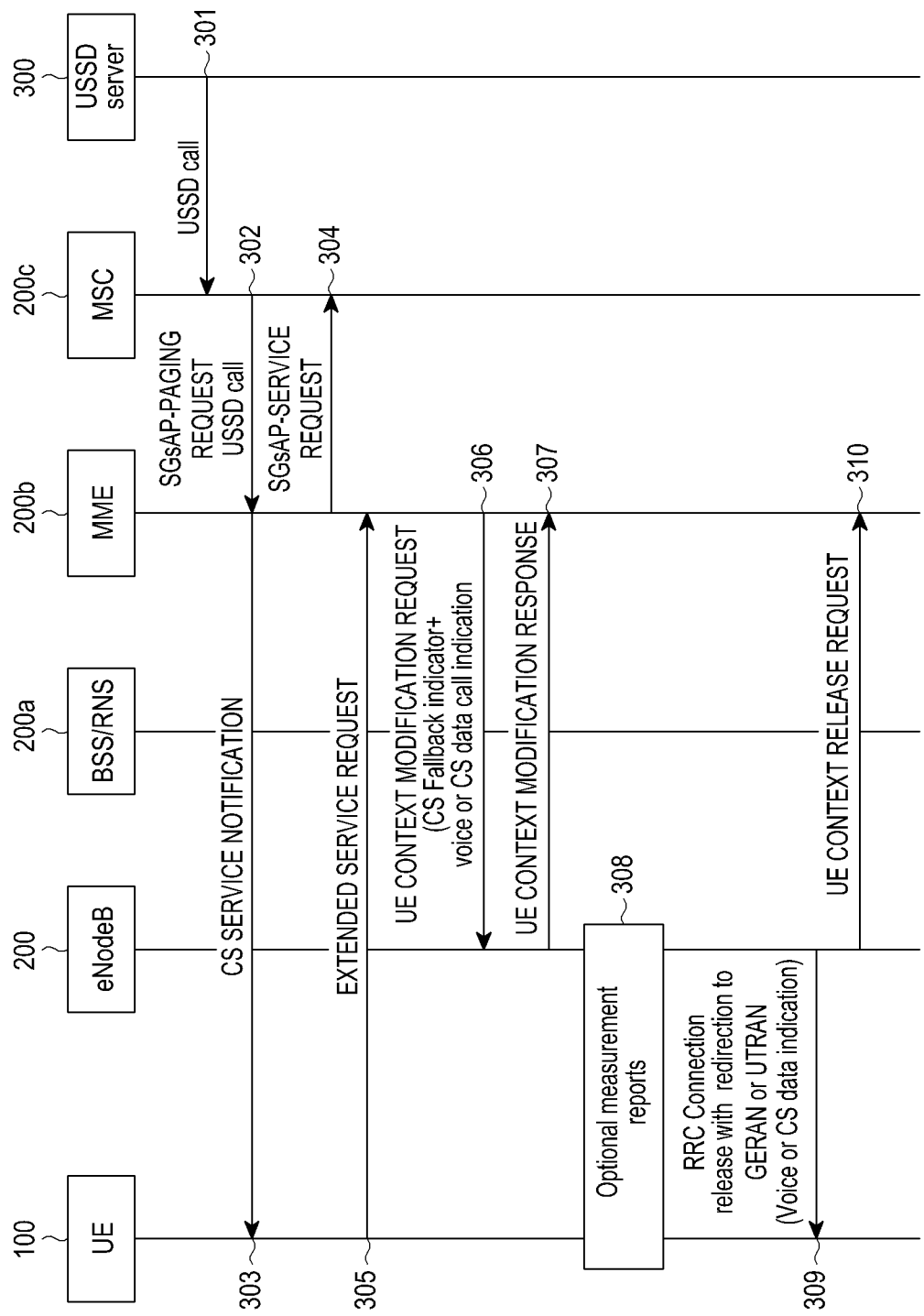

[Fig. 4]
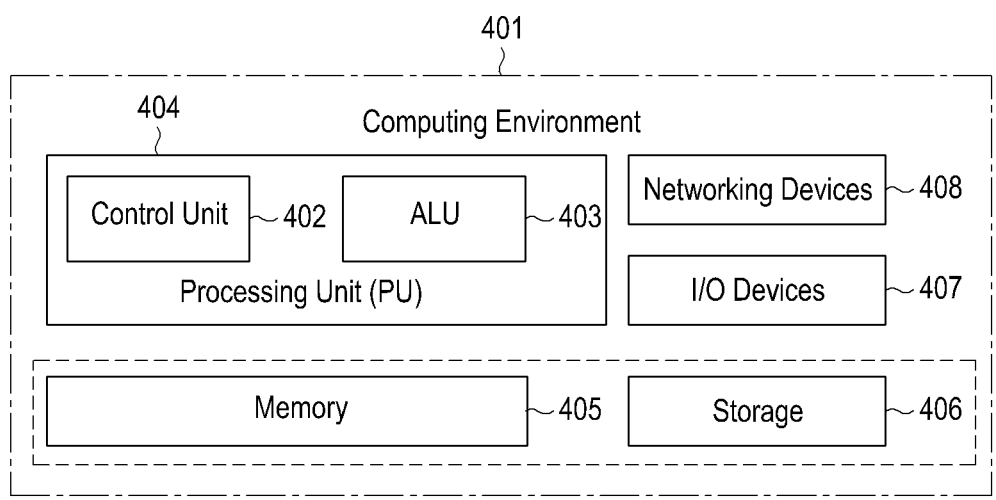

METHOD AND SYSTEM FOR HANDLING VOICE AND NON-VOICE CALLS IN A CSFB SCENARIO

CROSS-REFERENCE TO RELATED APPLICATION(S)

The present application claims priority under 35 U.S.C. § 365 to International Patent Application No. PCT/KR2013/004310 filed May 15, 2013, entitled "A METHOD AND SYSTEM FOR HANDLING VOICE AND NON-VOICE CALLS IN A CFSB SCENARIO". International Patent Application No. PCT/KR2013/004310 claims priority under 35 U.S.C. § 365 and/or 35 U.S.C. § 119(a) to Indian Patent Application No. 1930/CHE/2012 filed May 15, 2012, and which are incorporated herein by reference into the present disclosure as if fully set forth herein.

TECHNICAL FIELD

The present invention relates to the field of wireless communication systems and more particularly relates to handling voice and non-voice calls in a Circuit Switched Fallback (CSFB) scenario in Long Term Evolution (LTE) networks. The present application is based on, and claims priority from, an Indian Application Number, 1930/CHE/2012 filed on 15 May 2012, the disclosure of which is hereby incorporated by reference herein.

BACKGROUND ART

The 3rd Generation Partnership Project (3GPP) LTE is an evolving high speed, high capacity standard for user equipment (UE) emerging as a globally accepted standard. LTE operates in Packet Switched (PS) domain. Currently, UEs equipped with LTE technology utilize LTE PS domain to handle data traffic, while the voice traffic is handled by legacy Circuit Switched (CS) networks (legacy Radio Access Technologies (RATs)) such as Global System for Mobile communications (GSM), Universal Mobile Terrestrial System (UMTS) and GSM EDGE Radio Access Network (GERAN) and so on. To support CS domain communication such as voice calls, the UE has to switch to CS supporting legacy RATs.

The Circuit Switched Fallback (CSFB) procedure standardized by 3GPP technical specification enables the UE s to perform this switching during Mobile Originated (MO) or Mobile Terminated Call (MT). The 3GPP standard defines Inter-RAT (I-RAT) for mobility (switching) between LTE and earlier 3GPP technologies such as UMTS and GERAN. To acquire a legacy RAT during I-RAT switching, the 3GPP standard provides a redirection based CSFB procedure.

In accordance with existing 3GPP standard for redirection based CSFB procedure, when the CS call is attempted while UE is in LTE, the UE starts an Extended Service Request (ESR) procedure. When the ESR is received by E-UTRAN Node B (eNodeB) of the LTE network, the eNodeB provides the UE with Radio Resource Control (RRC) connection release along with redirection request including the target RAT frequency on to which the UE can camp for the CS call.

In the existing system, during the CSFB procedure, the target Radio Network Controller (RNC) is not aware that a call establishment is due to CSFB. This indicates that the RNC cannot prioritize the RRC connection requests for CSFB over other types of RRC connections (example for data or signaling). Further, in a loaded RNC, the already delayed call setup for a CSFB call can be inadvertently delayed if RNC cannot prioritize the RRC connection establishment for the CSFB call.

If the RNC is aware that the call establishment is due to CSFB call, then it can prioritize the CSFB calls in case of overload conditions in the network. Further, the CSFB calls can be either a CS voice call or a CS data call. The CSFB is triggered due to either of voice calls or non-voice (data) calls. It is important for any network operator to give priority for CS voice calls ahead of CS data calls (for example USSD call, FAX call and so on).

DISCLOSURE OF INVENTION

Technical Problem

In the light of above discussion, there is a need for a method and system for differentiating the CS voice calls from CS non-voice calls for the CSFB scenario in case of LTE networks.

The principal object of the embodiments herein is to provide a method and system for handling both voice and non-voice calls in a CSFB scenario.

Another object of the invention is to provide a method for differentiating voice and non-voice calls and prioritizing voice calls ahead of non-voice calls in the CSFB scenario.

Solution to Problem

Accordingly the invention provides a method for handling both voice and non-voice calls in a Circuit Switched Fallback (CSFB) scenario, wherein the method comprises providing a first indication to user equipment (UE) by a wireless network, wherein the first indication indicates voice call and non-voice call. Further the method comprises routing voice call or non-voice call to a target radio access network (RAN) by the UE, wherein the UE selects the target RAN based on the first indication. Further, the method comprises sending a second indication to the target RAN by the UE, wherein the second indication indicates if the CSFB call is voice call or non-voice call. Finally, the method comprises prioritizing the voice calls ahead of the non-voice calls by the RAN based on the second indication.

Accordingly the invention provides a core network (CN) for handling both voice and non-voice calls in a circuit switched fallback (CSFB) scenario, wherein the CN comprises a Mobility Management Entity (MME), further the CN is configured to provide an indication to a user equipment (UE), wherein the indication indicates voice call or non-voice call to the UE.

Accordingly the invention provides a user equipment (UE) for handling for handling both voice and non-voice calls in a circuit switched fallback (CSFB) scenario, wherein the UE comprises an integrated circuit. Further the integrated circuit comprises at least one processor and at least one memory. Further the memory comprises a computer program code within the circuit. At least one memory and the computer program code with the at least one processor cause the UE to receive a first indication from a wireless network for CSFB calls, wherein the first indication indicates voice call or non-voice call. Further the UE is configured to route the voice call or non-voice call to a target radio access network (RAN), wherein the UE selects the target RAN based on the first indication. Further the UE is configured to provide a second indication to the target RAN, wherein the second indication indicates if the CSFB call is voice call or non-voice call.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF DRAWINGS

This invention is illustrated in the accompanying drawings, throughout which like reference letters indicate corresponding parts in the various figures. The embodiments herein will be better understood from the following description with reference to the drawings, in which:

FIG. 1 illustrates the block diagram of a user equipment with various modules, according to embodiments as disclosed herein;

FIG. 2 illustrates a sequence diagram for CSFB scenario in the existing art;

FIG. 3 illustrates the sequence diagram in which an indication is provided to the UE for handling voice and non-voice calls in the CSFB scenario, according to the embodiments as disclosed herein; and FIG. 4 illustrates a computing environment implementing the method and system for handling both voice and non-voice calls in the CSFB scenario, according to the embodiments as disclosed herein.

MODE FOR THE INVENTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

The embodiments herein achieve a method and system for providing an indication to the user equipment (UE) whether the Circuit Switched Fallback (CSFB) call is a Circuit Switched (CS) voice call or a CS non-voice (data) call in Long Term Evolution (LTE) networks. The method and system disclosed herein provides a mechanism for handling both voice and non-voice calls in a CSFB scenario.

In an embodiment, a wireless network (comprising both core network and access network) provides an indication to an eNodeB whether the CSFB call is the CS voice call or the CS non-voice (data) call along with a CSFB indicator. Further, the eNodeB upon receiving such indication from the wireless network (for example Mobility Management Entity (MME)) acknowledges the indication and uses this indication to send to the UE.

In an embodiment, the wireless network (comprising both core network and access network) provides an indication to the UE whether the CSFB call is CS voice call or CS data call. Further, the UE upon receiving such indication from the wireless network indicates the CSFB call as voice call or non-voice call to a target radio access network (RAN) by providing a priority bit indication to all the voice calls. The RAN can differentiate the CS voice calls from the CS data calls using the priority bit indication provided by the UE.

In an embodiment, the wireless network provides an indication to the UE indicating voice and non-voice calls during the CSFB in a CS service notification message or a Radio Resource Control (RRC) connection release redirection message.

Further, the RAN prioritizes all the CS voice calls ahead of non-voice calls to the UE, where high priority is given to all the voice calls in case of the CSFB scenario in LTE networks.

In an embodiment, the UE can be a mobile phone, a smart phone, tablet, or any other electronic gadget that communicates with the wireless network.

In an embodiment, the non-voice calls or CS data calls in the CSFB scenario can include but not limited to Unstructured Supplementary Service Data (USSD) calls, FAX calls and so on and the like.

Referring now to the drawings, and more particularly to FIGS. 1 through 4, where similar reference characters denote corresponding features consistently throughout the figures, there are shown preferred embodiments.

FIG. 1 illustrates the block diagram of user equipment with various modules, according to embodiments as disclosed herein. As depicted in the figure, the user equipment (UE) 100 comprises a communication interface module 101, a power module 102, a display module 103 and a memory module 104. The communication interface module 101 helps the UE to connect to the wireless network. The power module 102 holds the battery information and status of battery power in the user equipment 100. The battery information comprises the amount of charge that the device possesses and the time period for which the user equipment 100 will be in operation and so on. The display module 103 of the user equipment 100 comprises of a user interface which can be a virtual keypad or through any other means by which a user can input some data into the user equipment 100. The memory module 104 may include a random access memory (RAM) or another type of dynamic storage device that may store information and instructions, for example an application, for execution by processor, a read-only memory (ROM) device or another type of static storage device.

FIG. 2 illustrates a sequence diagram for CSFB scenario in the existing art. The method of circuit switched fallback (CSFB) from LTE to GSM EDGE Radio Access Network (GERAN) or Universal Terrestrial Radio Access Network (UTRAN) is as described herein. The CSFB procedure includes the interfaces between the different radio access network (RAN) types and the core network entities. For supporting circuit switched (CS) services, a connection to the mobile switching centre (MSC) server is established. The Mobility Management Entity (MME 201) of the evolved packet system interfaces to the MSC server through a SGs interface. The CSFB mechanism is implemented using the SGs interface between MME 200b and MSC 200c. For CSFB, there will always be an RRC connection established in order to exchange signalling messages for initiating and preparing the fallback. In the case of terminating voice call, the UE 100 has to receive a paging message. In the case of mobile originating call, the UE 100 has to send a service request message. The UE 100 may also be involved in a data transfer when a voice call has to be set up.

When the MSC 200c receives an incoming voice call, it sends (201) a paging request to the MME 200b over the SGs interface. The MME 200b establishes an S1 connection and sends (202) the CS SERVICE NOTIFICATION message to the UE 100. The MME 200b informs (203) the MSC 200c with the SERVICE REQUEST message over SGs interface that the UE 100 is in connected mode. Further, the UE 100 upon receiving the CS SERVICE NOTIFICATION message, sends (204) an EXTENDED SERVICE REQUEST (ESR) message. This request message is used to respond to the CS fallback request from the MME 200b and includes a "CSFB response" indicator that indicates whether the UE 100 accepts or rejects a paging for CS fallback. If the UE accepts the CSFB, the MME 200b then informs (205) the eNodeB 200 with a UE CONTEXT MODIFICATION REQUEST, which indicates that the UE 100 should be moved to UTRAN or GERAN by means of CSFB procedure.

Further, the eNodeB 200 sends (206) a CONTEXT MODIFICATION RESPONSE to the MME 200b stating that the UE 100 is ready for a CS fallback. The eNodeB 200 may request (207) measurement reports of UTRAN or GERAN target cells from the UE 100 to determine a suitable carrier frequency on the target radio access technology for CSFB procedure.

A RRC connection release with redirection to GERAN or UTRAN is now triggered (208) by the eNodeB 200. Further, the eNodeB 200 requests (209) the MME 200b to release the S1 connection for the UE 100 with the UE CONTEXT RELEASE REQUEST message. This message also specifies whether the UE 100 would be able to receive packet switched services in the target cell.

Further, the UE 100 selects a cell of the target radio access technology and establishes a radio signalling connection with that cell.

FIG. 3 illustrates a sequence diagram in which an indication is provided to the UE for handling voice and non-voice calls in the CSFB scenario, according to the embodiments as disclosed herein. As the CSFB call can be either a CS voice call or a CS data call, a method for differentiating a CS voice call from a CS non-voice (data) call is as described herein.

In an embodiment, CS data call can include but not limited to a USSD call, FAX call or the like.

Further, each CS data call will be initiated from different type of servers that are designed for implementing a plurality of services. For example a USSD call is initiated by a USSD server, a FAX call can be initiated by a different server that has been designed to provide the service.

In an embodiment, for all CS data calls (USSD calls, FAX call and so on), a server (for example a USSD server 300) initiates USSD call and the USSD server 300 informs (301) the USSD call to the MSC 200c. In another example, a FAX call is initiated by any other server and the server informs the FAX call to the MSC 200c. In a similar way, each server that is initiating a CS data call informs the data call to MSC 200c. Further, the MSC 200c can identify the type of the data call (whether it is a USSD call, FAX call or any other data call), when it receives a CS data from the server.

For example, consider that the USSD server 300 initiates a USSD call to the UE 100 in a CSFB scenario. Referring to the figure, when the MSC 200c receives the USSD call from the USSD server 300, the MSC 200c sends (302) a paging request to the MME 200b over the SGs interface, indicating the USSD call. The MME 200b establishes an S1 connection and sends (303) the CS SERVICE NOTIFICATION message to the UE 100.

In an embodiment, the MME 200b sends the CS voice or CS data call in a first indication to the UE 100 in the CS SERVICE NOTIFICATION message.

Further, the MME 200b informs (304) the MSC 200c with the SERVICE REQUEST message over SGs interface that the UE 100 is in connected mode. Further, the UE 100 upon receiving the CS SERVICE NOTIFICATION message, sends (305) an EXTENDED SERVICE REQUEST (ESR) message. This request message is used to respond to the CS fallback request from the MME 200b and includes a "CSFB response" indicator that indicates whether the UE 100 accepts or rejects a paging for CS fallback. If the UE 100 accepts the CSFB, then the MME 200b informs (306) the eNodeB 200 with UE CONTEXT MODIFICATION REQUEST, which indicates that the UE 100 should be moved to UTRAN or GERAN by means of CSFB procedure.

In an embodiment, the CS voice or CS data call indication is provided to the eNodeB 200 using a first indication by the MME 201 in the UE CONTEXT MODIFICATION REQUEST.

Further, the eNodeB 200 sends (307) CONTEXT MODIFICATION RESPONSE to the MME 200b stating that the UE is ready for a CS fallback. The eNodeB 200 may request (308) measurement reports of UTRAN or GERAN target cells from the UE 100 to determine a suitable carrier frequency on the target radio access technology for CSFB procedure.

A RRC connection release with redirection to GERAN or UTRAN is now triggered (309) by the eNodeB 200.

In an embodiment, the first indication for indicating whether the CSFB call is CS data call or a CS voice call is provided to the UE 100 in the RRC connection release with redirection message.

Further, the UE 100 after receiving the RRC connection release with redirection to GERAN or UTRAN, sends a second indication, which indicates the CS voice calls or CS data calls to the target RAN.

In an embodiment, the UE sends all the voice calls with one bit priority indication to the target RAN in the second indication, where the target RAN (on which the UE will camp) can differentiate the CS voice calls from CS data calls using the one bit priority indication provided by the UE 100. Further, the target RAN can prioritize all the voice calls ahead of the non-voice calls, where a higher priority is given to the CS voice call compared to a CS data call in a CSFB scenario.

Further, the eNodeB 200 requests (310) the MME 200b to release the S1 connection for the UE 100 with the UE CONTEXT RELEASE REQUEST message. This message also specifies whether the UE 100 would be able to receive packet switched services in the target cell.

Even though in the above example a USSD call is used for demonstrating the method and system for handling voice and non-voice calls in the CSFB scenario, any CS data call can be initiated by the server (designed for the purpose) and the server informs the CS data call to the MSC 200c.

In an embodiment, the MSC 200c identifies and can differentiate the CS voice calls from the CS data calls, when it receives the CSFB calls from the server.

In an embodiment, the UE 100 after being aware of the fact that the incoming call in the LTE side is the USSD call, when redirected to the GERAN network, could indicate that the call is due to the CSFB and due to USSD in the initial RACH message itself.

In an embodiment, the UE 100 can indicate the call type at any later stage to the RAN (example: in the Stand-alone Dedicated Control Channel (SDCCH) message).

In an embodiment, the UE 100 after being aware of the fact that the incoming call in the LTE side is the USSD call, when redirected to a UTRAN network, could indicate that the call is due to CSFB and due to USSD in the initial Random Access Channel (RACH) message itself.

In an embodiment, the UE 100 could indicate the call type at any later stage to the network (example: in the common control channel message).

In an embodiment, the UE 100 at the target side i.e. in the GERAN or the UTRAN network will indicate that the call is due to a CSFB from LTE network and distinguish between CSFB for voice and CSFB for USSD (or any CS data call).

FIG. 4 illustrates a computing environment implementing the method and system for handling both voice and non-voice calls in a CSFB scenario, according to the embodiments as disclosed herein. As depicted the computing environment 401 comprises at least one processing unit 404 that is equipped with a control unit 402 and an Arithmetic Logic Unit (ALU) 403, a memory 405, a storage unit 406, plurality of networking devices 408 and a plurality Input output (I/O) devices 407. The processing unit 404 is responsible for processing the instructions of the algorithm. The processing unit 404 receives commands from the control unit in order to perform its processing. Further, any logical and arithmetic operations involved in the execution of the instructions are computed with the help of the ALU 403.

The overall computing environment 401 can be composed of multiple homogeneous and/or heterogeneous cores, multiple CPUs of different kinds, special media and other accelerators. The processing unit 404 is responsible for processing the instructions of the algorithm. Further, the plurality of processing units 404 may be located on a single chip or over multiple chips.

The algorithm comprising of instructions and codes required for the implementation are stored in either the memory unit 405 or the storage 406 or both. At the time of execution, the instructions may be fetched from the corresponding memory 405 and/or storage 406, and executed by the processing unit 404.

In case of any hardware implementations various networking devices 408 or external I/O devices 407 may be connected to the computing environment to support the implementation through the networking unit and the I/O device unit.

The embodiments disclosed herein can be implemented through at least one software program running on at least one hardware device and performing network management functions to control the elements. The elements shown in FIGS. 1 through 4 include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method for handling a circuit switched (CS) voice call and a CS non-voice call in a user equipment (UE), the method comprising:

upon occurrence of a circuit switched fallback (CSFB) call requiring network switching, receiving a CS service notification from a mobility management entity (MME), the CS service notification including a first indication indicating that the CSFB call is the CS voice call or the CS non-voice call;

transmitting an extended service request to the MME in response to the CS service notification;

after transmitting the extended service request to the MME, receiving a radio resource control (RRC) connection release including the first indication from an e-node b (eNB) that receives a UE context modification request including the first indication from the MME;

after receiving the RRC connection release, providing one among the CS voice call and the CS non-voice call with a second indication comprising a priority bit to a target radio access network (RAN), wherein the priority bit of the second indication indicates to the target RAN that the target RAN is to prioritize the CS voice call ahead of the CS non-voice call; and providing the target RAN with a third indication indicating a type of the CS non-voice call of the CSFB call based on the CSFB call being the CS non-voice call.

2. The method of claim 1, wherein the UE receives, from the eNB a request for measurement reports of Universal Terrestrial Radio Access Network (UTRAN) or Global System for Mobile communication (GSM) Enhanced Data rates for GSM Evolution (EDGE) Radio Access Network (GERAN) target cells to determine a suitable carrier frequency for a CSFB procedure.

3. A method for handling a circuit switched (CS) voice call and a CS non-voice call in a mobility management entity (MME), the method comprising:

upon receiving a circuit switched fallback (CSFB) call requiring network switching, transmitting a CS service notification to a user equipment (UE), wherein the CS service notification includes a first indication indicating that the CSFB call is the CS voice call or the CS non-voice call;

receiving an extended service request in response to the CS service notification from the UE;

identifying whether the CSFB call is the CS voice call or the CS non-voice call;

based on identifying the CSFB call as the CS non-voice call, identifying a type of the CS non-voice call of the CSFB call;

responsive to identifying whether the CSFB call is the CS voice call or the CS non-voice call, assigning a priority to the CS voice call;

after receiving the extended service request, transmitting a UE context modification request including the first indication to an e-node b (eNB), wherein the first indication is delivered to the UE though a radio resource control (RRC) connection release by the eNB;

receiving a UE context modification response from an eNB in response to the UE context modification request; and receiving a UE context release request from the eNB after the first indication is transmitted to the UE from the eNB, wherein the UE provides one among the CS voice call and the CS non-voice call with a second indication comprising a priority bit to a target radio access network (RAN), wherein the priority bit of the second indication indicates to the target RAN that the target RAN is to prioritize the CS voice call ahead of the CS non-voice call.

4. The method of claim 3, wherein, upon receiving the UE context modification response, the MME initiates moving the UE to Universal Terrestrial Radio Access Network (UTRAN) or Global System for Mobile communication (GSM) Enhanced Data rates for GSM Evolution (EDGE) Radio Access Network (GERAN) using CSFB.

5. The method of claim 3, wherein the UE context modification response indicates the UE is ready for a CS fallback.

6. The method of claim 3, wherein the MME receives from the eNB, a request for the MME to release an S1 connection with the UE.

7. The method of claim 5, wherein the request for the MME to release the S1 connection with the UE specifies whether the UE would be able to receive packet switched services in a target cell.

8. A user equipment (UE) for handling a circuit switched (CS) voice call and a CS non-voice call, the UE comprising:
a communication unit configured to communicate with an e-node b (eNB) and a mobility management entity (MME); and
a controller configured to control the communication unit;
wherein the controller is further configured to:
upon occurrence of a circuit switched fallback (CSFB) call requiring network switching, receive a CS service notification from the MME, the CS service notification including a first indication indicating that the CSFB call is the CS voice call or the CS non-voice call,
transmit an extended service request to the MME in response to the CS service notification,
after transmitting the extended service request to the MME, receive a radio resource control (RRC) connection release including the first indication from an eNB that receives a UE context modification request including the first indication from the MME, and
after receiving the RRC connection release, provide one among the CS voice call and the CS non-voice call with a second indication comprising a priority bit to a target radio access network (RAN), wherein the priority bit of the second indication indicates to the target RAN that the target RAN is to prioritize the CS voice call ahead of the CS non-voice call; and
provide the target RAN with a third indication indicating a type of the CS non-voice call of the CSFB call based on the CSFB call being the CS non-voice call.

9. The UE of claim 8, wherein the controller is configured to receive, from the eNB, a request for measurement reports of UTRAN or GERAN target cells to determine a suitable carrier frequency for a CSFB procedure.

10. A mobility management entity (MME) for handling a circuit switched (CS) voice call and a CS non-voice call, the MME comprising:
a communication unit configured to communicate with a user equipment (UE) and an e-node b (eNB); and
a controller configured to control the communication unit,
wherein the controller is configured to:
upon receiving a circuit switched fallback (CSFB) call requiring network switching,
transmit a CS service notification to the UE, wherein the CS service notification includes a first indication indicating that the CSFB call is the CS voice call or the CS non-voice call,
receive an extended service request in response to the CS service notification from the UE,
identify whether the CSFB call is the CS voice call or the CS non-voice call,
based on identifying the CSFB call as a CS non-voice call, identify a type of the CS non-voice call of the CSFB call,
responsive to identifying whether the CSFB call is the CS voice call or the CS non-voice call, assign a priority to the CS voice call,
after receiving the extended service request, transmit a UE context modification request including a first indication to an e-node b (eNB), wherein the first indication is delivered to the UE through a radio resource control (RRC) connection release by the eNB,
receive a UE context modification response from the eNB in response to the UE context modification request, and
receive a UE context release request from the eNB after the first indication is transmitted to the UE from the eNB,
wherein the UE provides one among the CS voice call and the CS non-voice call with a second indication comprising a priority bit to a target radio access network (RAN),
wherein the priority bit of the second indication indicates to the target RAN that the target RAN is to prioritize the CS voice call ahead of the CS non-voice call.

11. The MME of claim 10, wherein upon receiving the UE context modification response, the MME initiates moving the UE to Universal Terrestrial Radio Access Network (UTRAN) or Global System for Mobile communication (GSM) Enhanced Data rates for GSM Evolution (EDGE) Radio Access Network (GERAN) using CSFB.

12. The MME of claim 10, wherein the UE context modification response indicates the UE is ready for a CS fallback.

13. The MME of claim 10, wherein the controller is configured to: receive from the eNB, a request for the MME to release an S1 connection with the UE.

14. The MME of claim 13, wherein the request to release the S1 connection with the UE specifies whether the UE would be able to receive packet switched services in a target cell.

* * * * *